E. BERGMAN.
SEINE PULLER MACHINE.
APPLICATION FILED DEC. 14, 1914.

1,164,629.

Patented Dec. 21, 1915.

Inventor

Erick Bergman

By

Attorneys

UNITED STATES PATENT OFFICE.

ERICK BERGMAN, OF WAYSIDE, MISSISSIPPI.

SEINE-PULLER MACHINE.

1,164,629.  Specification of Letters Patent. Patented Dec. 21, 1915.

Application filed December 14, 1914. Serial No. 877,166.

*To all whom it may concern:*

Be it known that I, ERICK BERGMAN, a citizen and resident of the United States, residing at Wayside, in the county of Washington and State of Mississippi, have invented a new and useful Seine-Puller Machine, of which the following is the specification.

This invention relates to apparatus for hauling seines from the water, and its object is to provide a simple and efficient apparatus of this kind, and one which can be easily controlled.

The above stated object is attained by means of a novel combination and arrangement of parts to be hereinafter described and claimed, and in order that the invention may be better understood, reference is had to the accompanying drawing in which—

Figure 1:
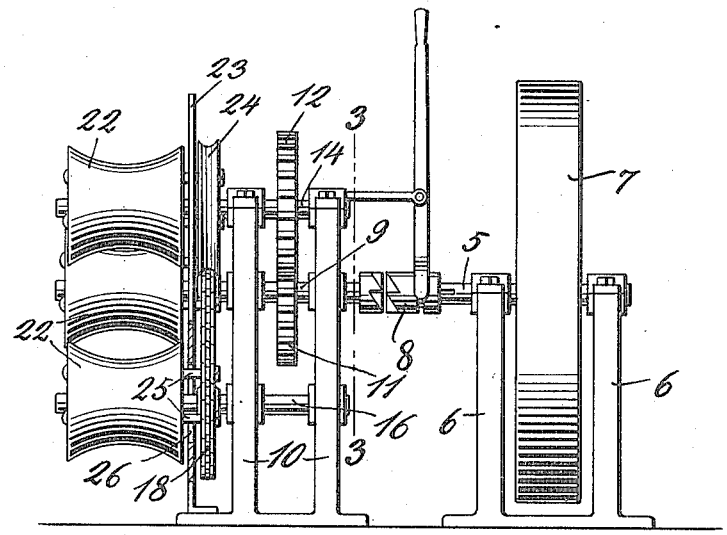
Figure 2:
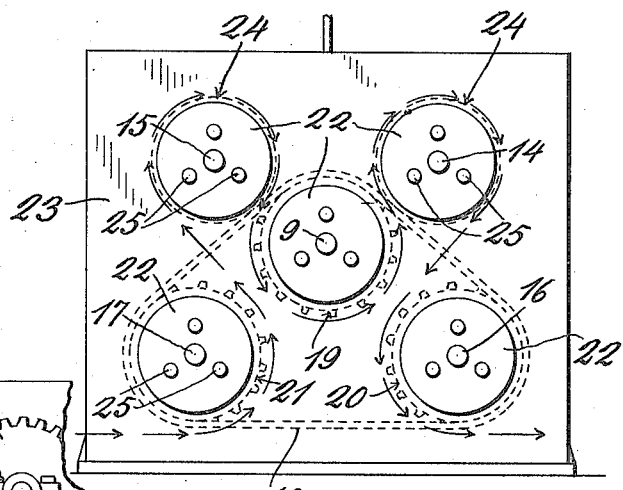
Figure 3:
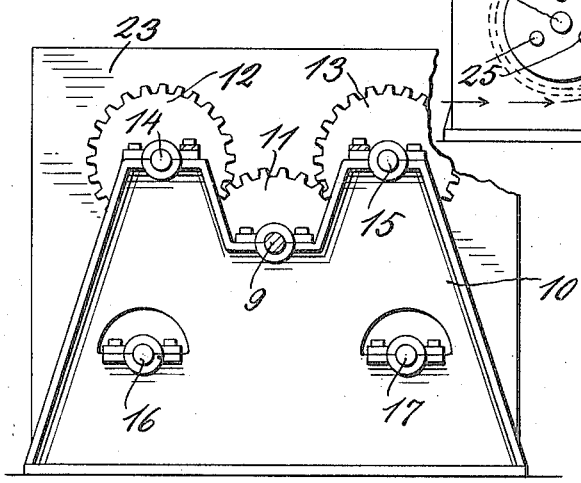

Figure 1 is a side elevation of the apparatus, partly broken away; Fig. 2 is a front elevation thereof, and Fig. 3 is a sectional detail on the line 3—3 of Fig. 1.

Referring specifically to the drawing, 5 denotes a drive shaft supported by bearing stands 6 and provided with a pulley 7 belted to a suitable source of power, which latter need not be shown or described as it forms no part of the present invention. In alinement with the shaft 5, and connected thereto by a suitable clutch 8, is a shaft 9 supported by bearing stands 10.

On the shaft 9 is fast a gear wheel 11 which is in mesh with gear wheels 12 and 13, located on opposite sides of the gear wheel 11. The shafts of the gear wheels 12 and 13 are indicated at 14 and 15, respectively, said shafts being supported by the stands 10.

Below the shafts 14 and 15, the stands 10 support shafts 16 and 17, located respectively on opposite sides of the shaft 9. On the shafts 9, 16 and 17 are fast sprocket wheels which are connected by a chain 18. These sprocket wheels are indicated at 19, 20 and 21, respectively.

Mounted on the shafts 9, 14, 15, 16 and 17, to turn therewith, are spools 22 for pulling the seine, the latter passing between the spools as shown dotted in Fig. 2. Between the inner ends of the spools and the sprocket wheels 19, 20 and 21 is a guard plate 23 to prevent the seine catching on said sprocket wheels or on the chain 18. The peripheries of the spools are grooved to obtain a better hold on the seine.

In operation, the hauling end of the seine is carried behind the spool on the shaft 17, then upward over the spool on the shaft 15, then down under the spool on the shaft 9, then upward and over the spool of the shaft 14, and finally downward and under the spool of the shaft 16. By passing the seine around the spools in this manner and locating the spools in different planes as shown, the seine is firmly gripped, and upon turning the spools in the proper direction the seine is hauled. The spools are turned in this direction through the hereinbefore described gearing between the shaft 9 and the spool shafts, the shaft 9 being driven by the shaft 5 when the clutch 8 is thrown in. The hauling is stopped by throwing the clutch to disconnect the shafts 9 and 5, and the operation of the apparatus is therefore readily controlled.

On the shafts 14 and 15 are grooved pulleys 24, the same being fast on the shafts. The spools of these shafts are made fast to the pulleys by bolts 25. In a like manner, the spools of the shafts 9, 16 and 17 are made fast to the sprocket wheels 19, 20 and 21. It will be understood, of course, that any other means may be provided for mounting the spools so that they turn with the respective shafts. The pulleys 24 also serve as guards for the chain 18 to prevent the same from jumping the sprocket wheels, they being located on opposite sides of the center sprocket wheel 19, close to the upper run of the chain. The plate 23 has openings 26 to accommodate the bolts 25.

The preferred embodiment of the invention has been shown, but it will be evident that various changes in the structural details may be made without a departure from the spirit and scope of the invention as claimed hereinafter.

I claim:—

An apparatus for hauling seines, comprising a series of winding spools consisting of a center spool and top and bottom spools on each side thereof, shafts carrying the spools, intermeshing gears on the shafts of the center and the top spools, sprocket wheels on the shafts of the center and the bottom spools, a drive chain passing over said sprocket wheels, and a driving means connected to the shaft of the center spool.

ERICK BERGMAN.

Witnesses:
LAMAR WATSON,
J. B. COLEMAN.